United States Patent
Wong et al.

(10) Patent No.: US 12,106,190 B2
(45) Date of Patent: Oct. 1, 2024

(54) SERVER OF REINFORCEMENT LEARNING SYSTEM AND REINFORCEMENT LEARNING METHOD

(71) Applicant: Tamkang University, New Taipei (TW)

(72) Inventors: Ching-Chang Wong, New Taipei (TW); Yang-Han Lee, New Taipei (TW); Kung-Han Chen, New Taipei (TW)

(73) Assignee: TAMKANG UNIVERSITY, New Taipei (TW)

( * ) Notice: Subject to any disclaimer, the term of this patent is extended or adjusted under 35 U.S.C. 154(b) by 976 days.

(21) Appl. No.: 17/107,443

(22) Filed: Nov. 30, 2020

(65) Prior Publication Data
US 2022/0172104 A1 Jun. 2, 2022

(51) Int. Cl.
*G06N 20/00* (2019.01)
*G06N 5/043* (2023.01)

(52) U.S. Cl.
CPC ............. *G06N 20/00* (2019.01); *G06N 5/043* (2013.01)

(58) Field of Classification Search
CPC ........ G06N 20/00; G06N 5/043; G06N 3/006; G06N 3/092
See application file for complete search history.

(56) References Cited

U.S. PATENT DOCUMENTS

| | | | | |
|---|---|---|---|---|
| 10,700,935 | B1* | 6/2020 | Mousavi | G06N 20/00 |
| 2018/0260691 | A1* | 9/2018 | Nagaraja | G06N 3/063 |
| 2021/0081723 | A1* | 3/2021 | Wayne | G06F 18/2193 |
| 2021/0201156 | A1* | 7/2021 | Hafner | G06N 3/084 |
| 2021/0224685 | A1* | 7/2021 | Mitra | G06N 3/08 |
| 2022/0343164 | A1* | 10/2022 | Espeholt | G06N 3/045 |

* cited by examiner

*Primary Examiner* — Dave Misir
(74) *Attorney, Agent, or Firm* — Birch, Stewart, Kolasch & Birch, LLP (57) ABSTRACT

A reinforcement learning system is provided, including at least one agent and a server. According to a set condition, the at least one agent transmits a plurality of state sets related to a state of the environment through a network, receives a plurality of action sets for performing an action, and transmits, to the server, a plurality of feedback messages generated after interacting with the environment. The server configures a predetermined ratio of the memory space as at least one workstation according to the set condition, and selects an untrained model to be temporarily stored in the at least one workstation. The at least one workstation imports a current state set, a current action set, and a current feedback message, as parameters, into the untrained model for reinforcement learning, and generates a next action set until a goal is achieved.

12 Claims, 11 Drawing Sheets

SERVER OF REINFORCEMENT LEARNING SYSTEM AND REINFORCEMENT LEARNING METHOD

BACKGROUND

Technical Field

The present invention relates to a reinforcement learning system, and in particular, to a server of a reinforcement learning system and a reinforcement learning method.

Related Art

"Reinforcement learning (RL)" may be the hottest direction in the field of artificial intelligence. The reason why the reinforcement learning is popular is related to a great success of application of artificial intelligence to AlphaGo and AlphaZero by the DeepMind team.

The reinforcement learning is a way approaching human learning and emphasizes how to act based on an environment to maximize expected benefits. For example, white mice in a laboratory learn to obtain food by operating a lever: The white mice are an agent making a decision. At an initial state, because the white mice still have no opportunity to explore the environment, at first, a behavior of the white mice is random and has no target orientation until the white mice accidentally touch a lever in a specially set environment, and the white mice accidentally obtain the food, that is, a reward for the behavior, through an action of pulling the lever, and driven by a reward mechanism of the brain, the white mice begin to use a learning method with a target orientation. In order to obtain more food rewards, the white mice may gather next to the lever and keep trying until the white mice learn how to pull the lever correctly.

Because the reinforcement learning needs to be acted based on the environment, all architectures are set on the agent, so that learning efficiency is limited by resources and efficiency of the agent itself. What is important is that for each agent, all hardware architectures and software resources related to the reinforcement learning need to be configured, and once there are different learning objectives, an original reinforcement learning architecture cannot be reused or updated, so that a scope of application and practicality still needs to be increased greatly.

SUMMARY

Therefore, the present invention is intended to provide a reinforcement learning system that can increase learning efficiency, a scope of application, and practicality and a server thereof, and a reinforcement learning method.

Therefore, the present invention provides the reinforcement learning system and the server thereof, and the reinforcement learning method.

Effects of the present invention are described below: the present invention performs training through configured hardware resources located in the cloud, to improve learning efficiency, and modular design can make a reinforcement learning framework easier to reuse and update, to be adapted for different agents and increase a scope of application and practicality.

BRIEF DESCRIPTION OF THE DRAWINGS

Other features and effects of the present invention are clearly presented in implementations with reference to the drawings.

DETAILED DESCRIPTION

Figure 1:
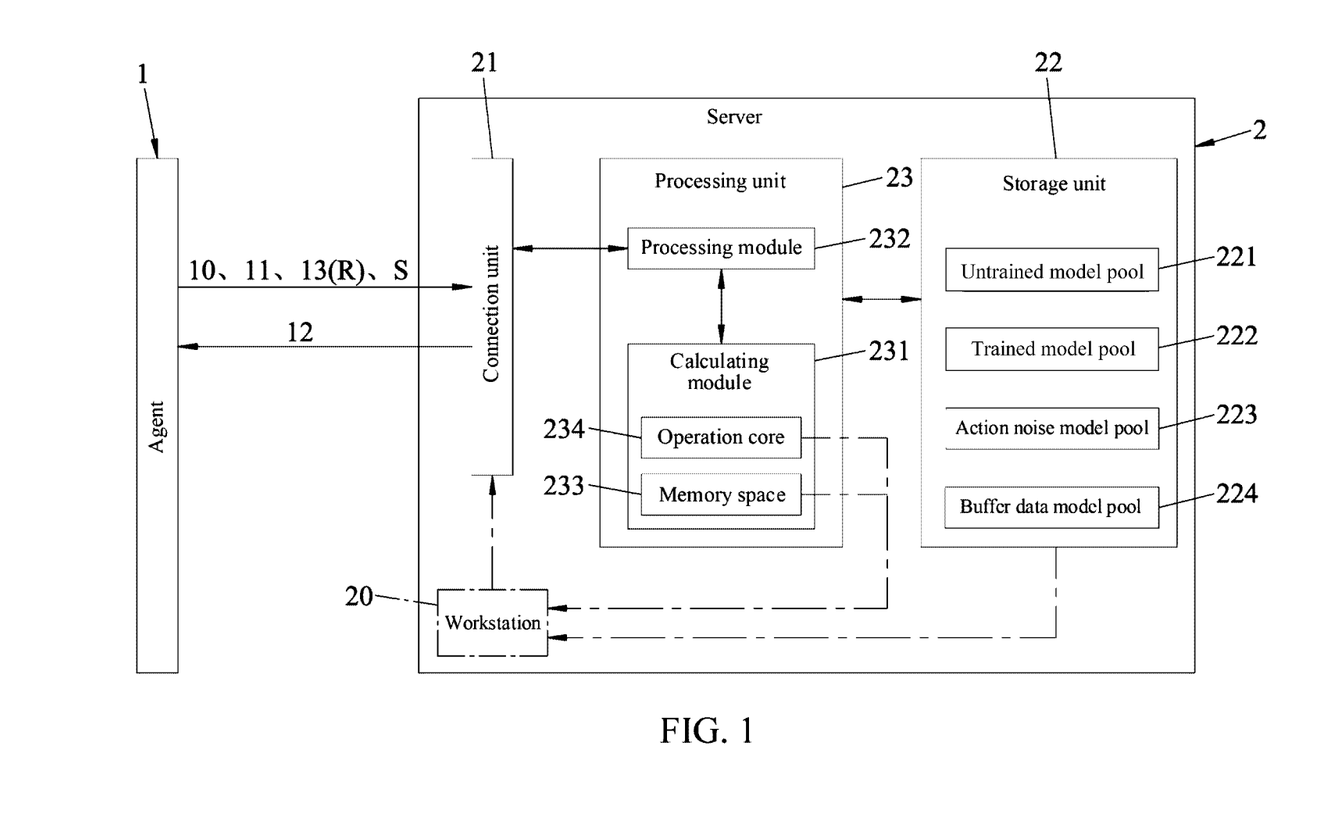
FIG. 1 is a block diagram illustrating an embodiment of a reinforcement learning system of the present invention.
Figure 2:
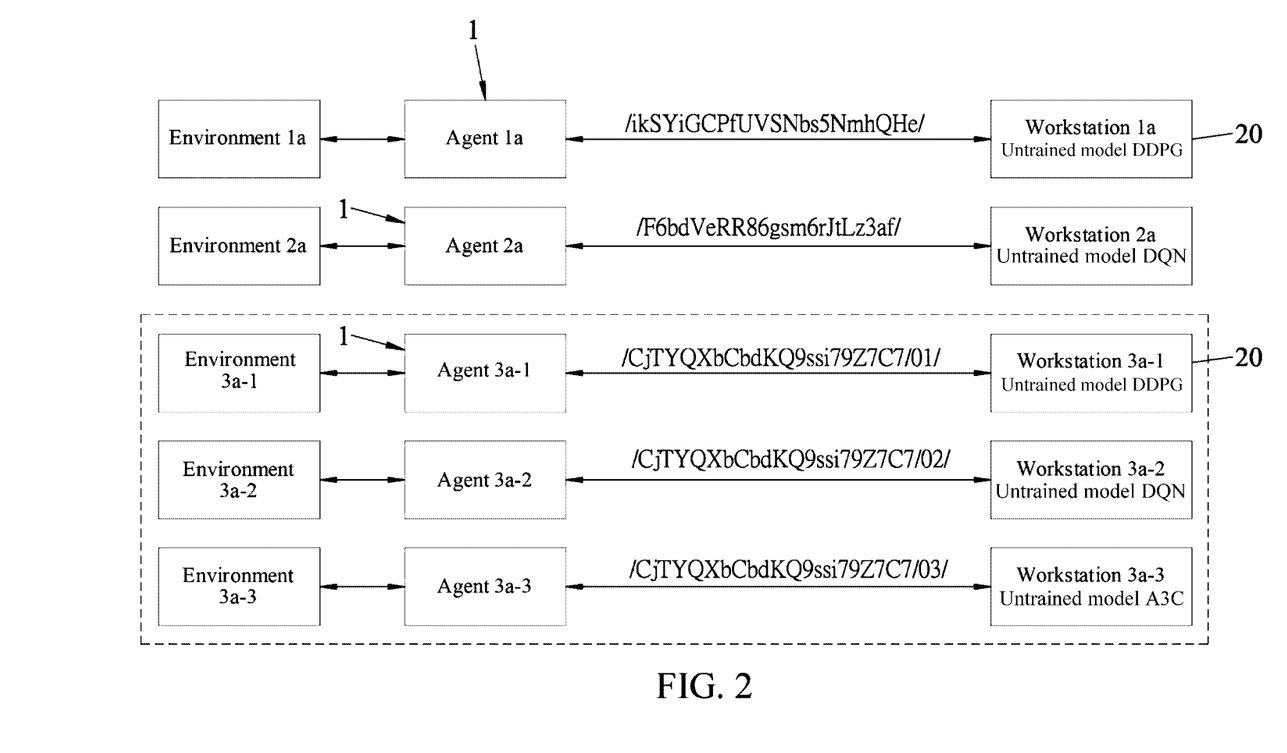
FIG. 2 is a block diagram illustrating that a plurality of state sets, a plurality of action sets, and a plurality of feedback messages in this embodiment may be transmitted between an agent storing a same identification code and a corresponding workstation.

Referring to FIG. 1 and FIG. 2, an embodiment of a reinforcement learning system of the present invention includes a plurality of agents 1 and a server 2.

According to a set condition 10, each agent 1 transmits a plurality of state sets 11 related to a state of an environment, receives a plurality of action sets 12 for performing an action, and transmits a feedback message 13 generated after interacting with the environment, and a stop signal S for stopping the action. The set condition 10 is used to achieve a goal. The feedback message 13 includes a reward value R of the action.

It should be noted that there may be a plurality of agents 1, but the number is not limited thereto, and in other variations of this embodiment, there may be one agent.

The server 2 includes a connection unit 21, a storage unit 22, and a processing unit 23.

In this embodiment, the connection unit 21 is in communication with the agent 1 by using a communication technology, and is configured to receive the set condition 10 of each agent 1, the state sets 11, and the feedback message 13, and to transmit the action sets 12 to each agent 1.

In this embodiment, the storage unit 22 is a memory or storage medium, and includes an untrained model pool 221 for storing a plurality of untrained models, and a trained model pool 222 for storing a plurality of trained models, an action noise model pool 223 for storing an action noise model, and a buffer data model pool 224 for storing a plurality of buffer data models. In this embodiment, the untrained models include but are not limited to a DQN module, a DDPG module, an A3C module, a PPO module, and a Q-learning module. Each trained model is one of the untrained models completing training and achieving the goal. The action noise model is used to increase exploration of the environment by the at least one agent 1, including but not limited to an s greedy module and an Uhlenbeck module. The buffer data model is used to determine a manner in which data is accessed and temporarily stored, including but not limited to a replay buffer model and a simple buffer model.

The processing unit 23 includes a calculating module 231 and a processing module 232 connected to the connection unit 21, the storage unit 22, and the calculating module 231.

In this embodiment, the calculating module 231 may be composed of more than one central processing unit, or composed of more than one graphics processing unit, or composed of more than one central processing unit and more than one graphics processing units. The calculating module 231 further has a memory space 233 and a plurality of operation cores 234.

In this embodiment, the processing module 232 is composed of more than one central processing unit, and configures a predetermined ratio of a memory space 233 and a predetermined number of the operations core 234 as more than one workstation 20 according to the set condition 10 of each agent 1.

Figure 3:
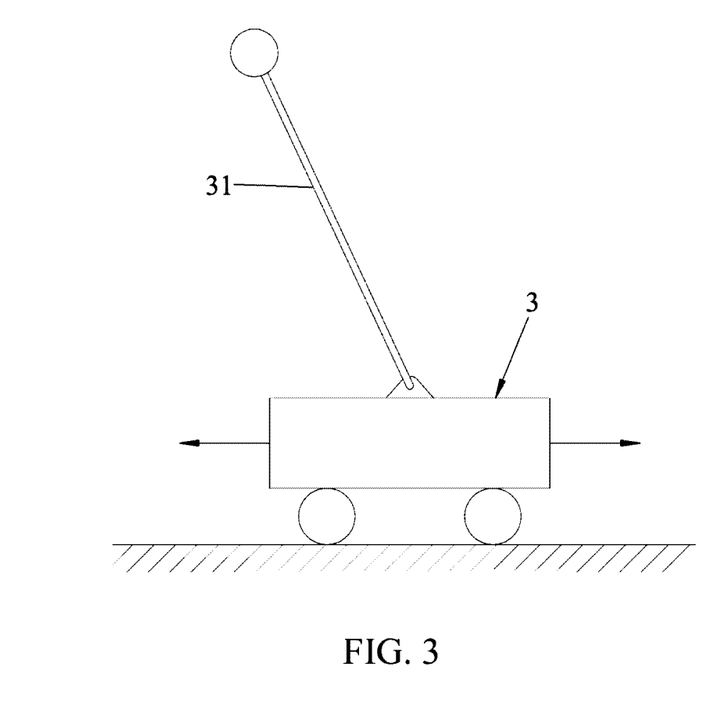
FIG. 3 is a schematic diagram of a cart.

Referring to FIG. 2 and FIG. 3, for the convenience of explanation, the agents 1 are distinguished by using numbers 1a, 2a, 3a-1, 3a-2, and 3a-3 and respectively correspond to the environments numbered 1a, 2a, 3a-1, 3a-2, 3a-3, and workstations 20 numbered 1a, 2a, 3a-1, 3a-2, 3a-3. For example, when an environment numbered 1a is a cart 3, under the set condition 10 shown in FIG. 1, the cart 3 is moved to the left or right in a manner, so that a pole 31 on the cart 3 may remain standing without falling.

Step 404: The processing module 232 generates a unique identification code U according to the connected agent 1, and the identification code U, and the untrained model, the selected buffer data model, and the action noise model selected in the set condition 10 are temporarily stored in a corresponding workstation 20.

It should be noted that the identification code U includes a primary numeric string (universally unique identifier, UUID) U1 and a secondary numeric string (room_id) U2. Different primary numeric strings U1 represent different agents 1 in different environments. Different secondary numeric strings U2 represent different agents 1 performing different actions in the same environment. If there is only one agent 1 performing one type of action in the same environment, the secondary numeric string U2 is omitted. In other words, each of the primary numeric strings U1 corresponds to the different environment, each of the secondary numeric strings U2 corresponds to the different agent, and the processing module 232 selects the corresponding untrained model according to the agent.

As shown in FIG. 2, an environment numbered 1a is the cart 3, an identification code U of an agent 1 numbered 1a corresponding to an environment numbered 1a is /ikSYiGCPfUVSNbs5NmhQHe/, an environment numbered 2a is a breakout game, an identification code U of an agent 1 numbered 2a in an environment numbered 2a is /F6bdVeRR86gsm6rJtLz3af/, an environment numbered 3-1a, an environment numbered 3-2a, and an environment

TABLE 1

| Data | Name | Scope |
|---|---|---|
| State | Position of the cart 3 | [−2.4 m, 2.4 m] |
|  | Speed of the cart 3 | [−Inf, Inf] |
|  | Angle of a pole 31 | [−41.8°, 41.8°] |
|  | Speed of the pole 31 | [−Inf, Inf] |
| Action | Push the cart 3 toward the left by one step | |
|  | Push the cart 3 toward the right by one step | |
| Stop condition | An angle of the pole 31 is greater than ±12° | |
|  | A position of the cart 3 is greater than ±2.4 m | |
|  | The number of steps of each round is greater than 200 steps | |
| Goal | The number of steps of each round is greater than 200 steps, and there are continuous 10 rounds | |
| Feedback message 13 | For every additional step, the reward value is R + 1 | |
| Algorithm | A selected untrained model (or automatically found best untrained model), a selected trained model, and a selected buffer data model | |
| Resource allocation | a 10% memory space 233, one operation core 234, and one workstation 20 | |

Figure 4:
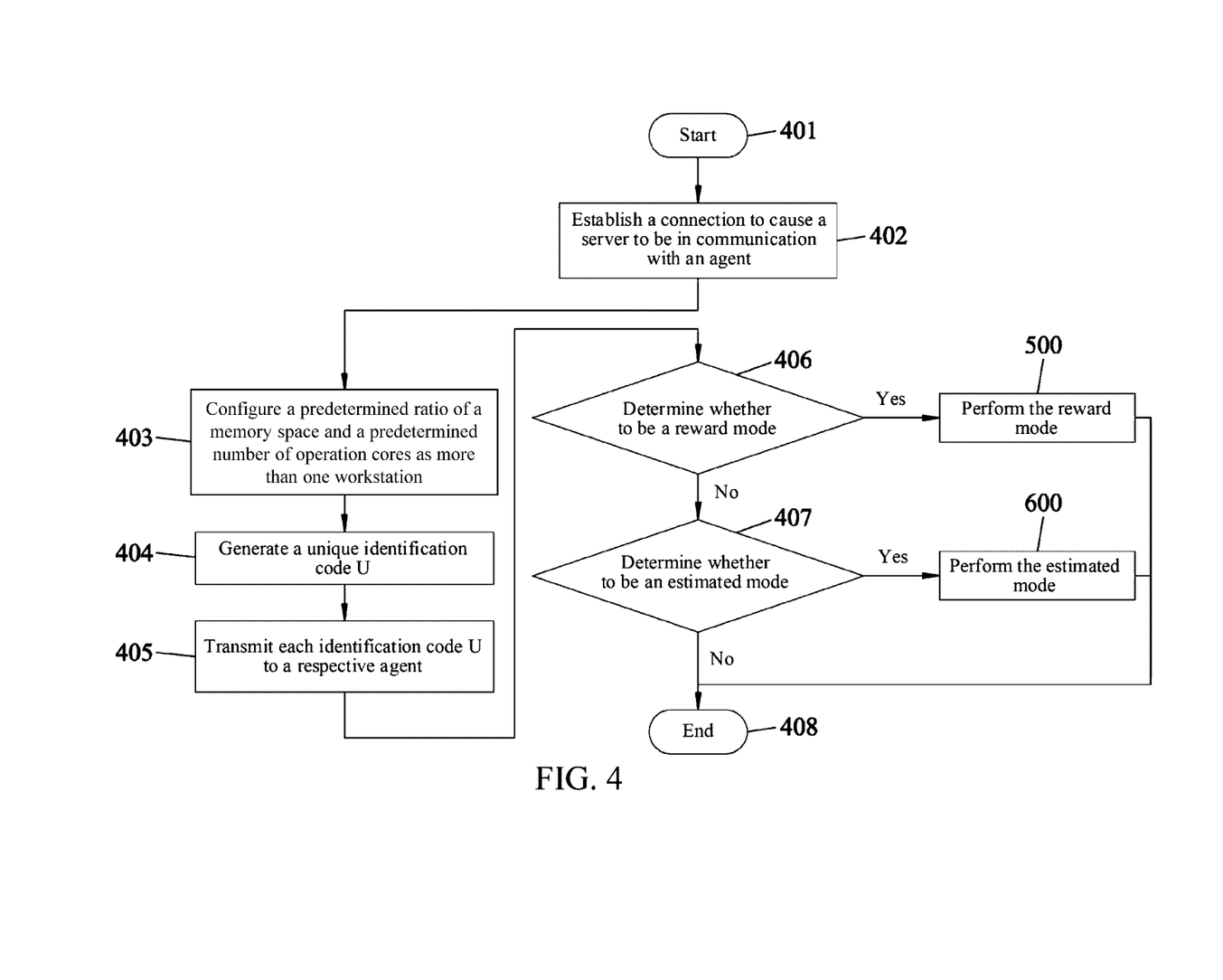
FIG. 4 is a flowchart illustrating steps of a reinforcement learning method of the present invention combined with this embodiment.

Referring to FIG. 4, FIG. 1, and FIG. 2, for a reinforcement learning method for this embodiment, the following steps are implemented through the server 2:

Step 401: Start.

Step 402: Establish a connection with the agent 1 numbered 1a through the connection unit 21, so that the server 2 is in communication with the agent 1 numbered 1a.

Step 403: The processing module 232 configures a predetermined ratio of a memory space 233 and a predetermined number of operation cores 234 as more than one workstation 20 according to a set condition 10 of the agent 1 numbered 1a.

It should be noted that the set condition 10 is not limited to using the 10% memory space 233 as shown in Table 1, one operation core 234, and one workstation 20. In other variations of this embodiment, 20% to 100% memory space 233, P operation scores 234, and K workstations 20 may further be used, and then each workstation 20 uses 20% to 100%/k memory space 233, and P≤K.

numbered 3-3a are a same obstacle avoidance space, an identification code U of an agent 1 numbered 3-1a corresponding to an environment numbered 3-1a is /CjTYQXbCbdKQ9ssi79Z7C7/01/, an identification code U of an agent 1 numbered 3-2a corresponding to an environment numbered 3-2a is /CjTYQXbCbdKQ9ssi79Z7C7/02/, and an identification code U of an agent 1 numbered 3-3a corresponding to an environment numbered 3-3a is /CjTYQXbCbdKQ9ssi79Z7C7/03/, where the "/ikSYiGCPfUVSNbs5NmhQHe/", the "/F6bdVeRR86gsm6rJtLz3af/", and the "/CjTYQXbCbdKQ9ssi79Z7C7/" are the primary numeric strings U1, and the "/01/", the "/02/", and the "/03" are the secondary numeric strings U2.

Step 405: The processing module 232 transmits the identification code U to the agent 1 numbered 1a through the connection unit 21, so that the state set 11, the action set 12, and the feedback message 13 are transmitted between the agent 1 storing the same identification code U and the corresponding workstation 20, that is, being transmitted between the agent 1 numbered 1a and the workstation 20 numbered 1a.

Step 406: The processing module 232 determines whether to be a reward mode according to the set condition 10. If yes, perform step 500; if no, perform step 407.

Step 407: The processing module 232 determines whether to be an estimation mode according to the set condition 10. If yes, perform step 600; if not, perform step 408.

Step 408: End.

Figure 5:
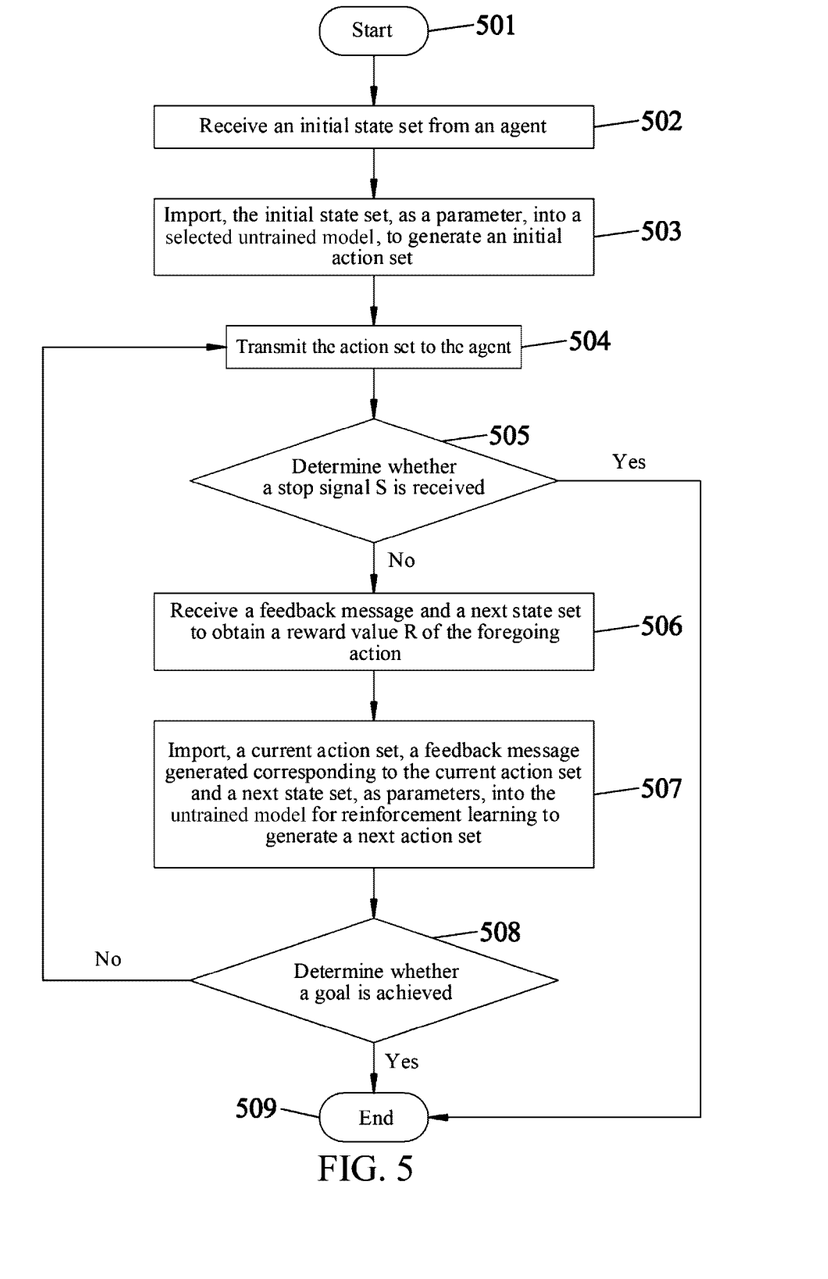
FIG. 5 is a flowchart illustrating steps of a reward mode in this embodiment.
Figure 6:
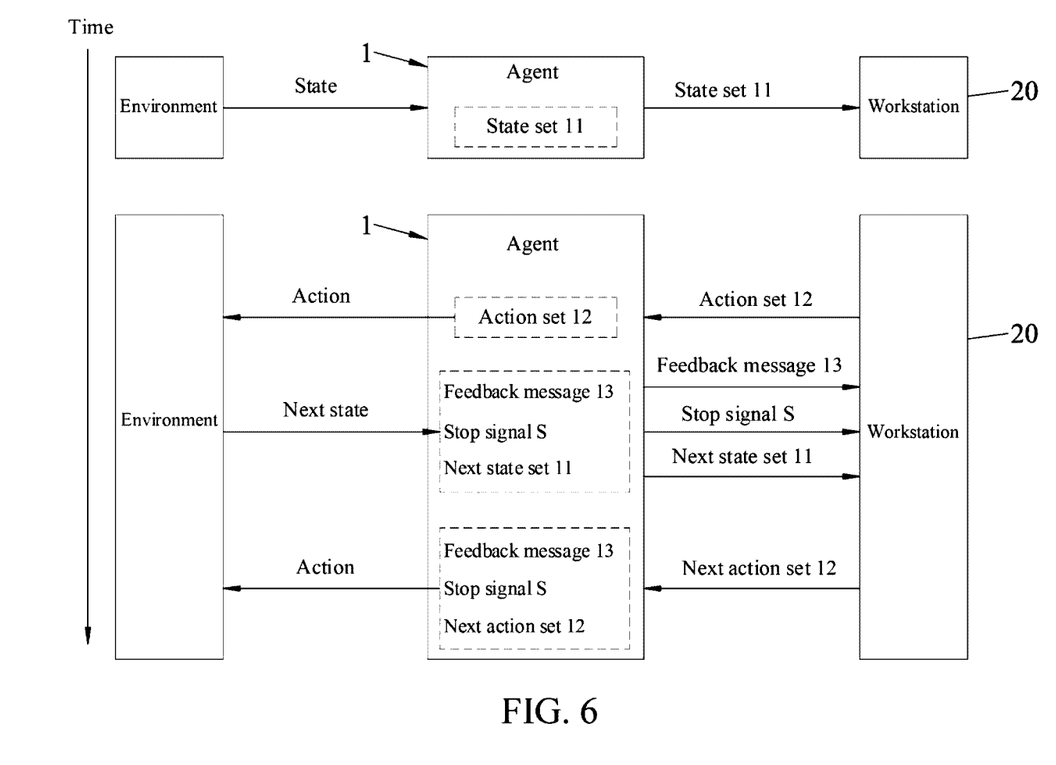
FIG. 6 is a block diagram illustrating a relationship between the reward mode and time in this embodiment.
Figure 7:
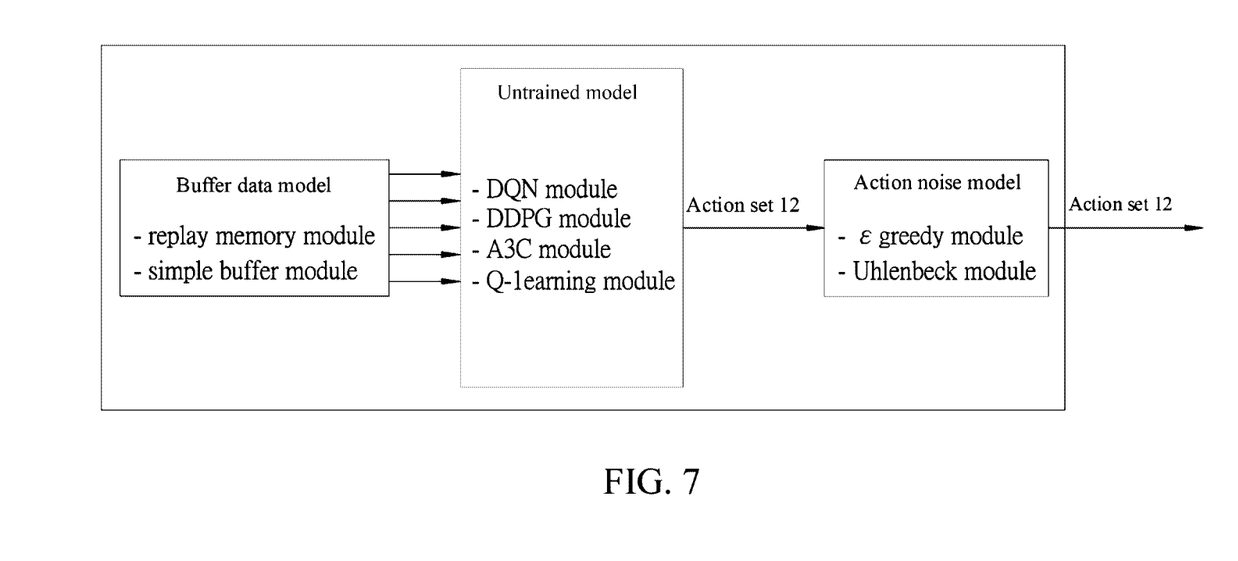
FIG. 7 is a schematic diagram illustrating a modularized buffer data model, an untrained model, a trained model, and an action noise model in this embodiment.

Referring to FIG. 5, FIG. 2, FIG. 6, and FIG. 7, step 500 includes:

Step 501: Start.

Step 502: Receive an initial state set 11 from an agent 1 numbered 1a through the connection unit 21. The state set 11 is obtained by the agent 1 through observing an environment.

Step 503: A workstation 20 numbered 1a temporarily stores the state set 11 through the memory space 233, and imports the initial state set 11, as a parameter, through the operation core 234 into a selected untrained model to generate an initial action set 12.

Step 504: The workstation 20 numbered 1a transmits the action set 12 to the agent 1 numbered 1a through the connection unit 21, so that the agent 1 numbered 1a interacts with an environment numbered 1a according to the action set 12, thereby changing a state of the environment numbered 1a. As shown in FIG. 3, the agent 1 numbered 1a changes a position and a speed of the cart 3 and an angle, a speed, and other states of the pole 31 by pushing the cart 3 toward the left or the right by one step.

It should be noted that, for the position and the speed of the cart 3, and the angle, the speed, and other states of the pole 31, after positions of the cart 3 and the pole 31 are detected and observed by a sensor (not shown) of the agent 1, the speeds of the cart 3 and the pole 31 are calculated. The foregoing technology for obtaining the states is disclosed in the prior art of reinforcement learning, and is not a technical feature applied in the present invention. Because a person with ordinary knowledge in the field can infer additional details based on the foregoing description, the details are not described again.

Step 505: The workstation 20 numbered 1a determines whether a stop signal S is received through the connection unit 21. If yes, perform step 506, which means that the angle of the pole 31 exceeds ±12° and the pole 31 may fall, or that the position of the cart 3 is greater than ±2.4 m (meters) and is out of a detectable range, or that the number of steps in this round is greater 200 steps; if not, continue performing determination.

Step 506: The workstation 20 numbered 1a receives the feedback message 13 and a next state set 11 transmitted by the agent 1 numbered 1a through the connection unit 21, and obtains a reward value R for the foregoing action. The foregoing next state set 11 is generated by the agent 1 numbered 1a through interaction between the initial action set 12 and the environment numbered 1a in step 504. For example, the position or speed of the cart 3 is changed, or the angle or speed of the pole 31 is changed.

Step 507: The workstation 20 numbered 1a temporarily stores a current action set 12, a feedback message 13 generated corresponding to the current action set 12, and the next state set 11 through the memory space 233, and imports, through the operation core 234, the current action set 12, the feedback message 13 generated corresponding to the current action set 12, and the next state set 11, as parameters, into the untrained model for reinforcement learning to generate a next action set 12.

Step 508: The workstation 20 numbered 1a determines, through the operation core 234, whether the cart 3 has more than 200 steps for 10 consecutive rounds, thus achieving the goal. If yes, perform step 509; if not, return to step 504.

Step 509: End.

Figure 8:
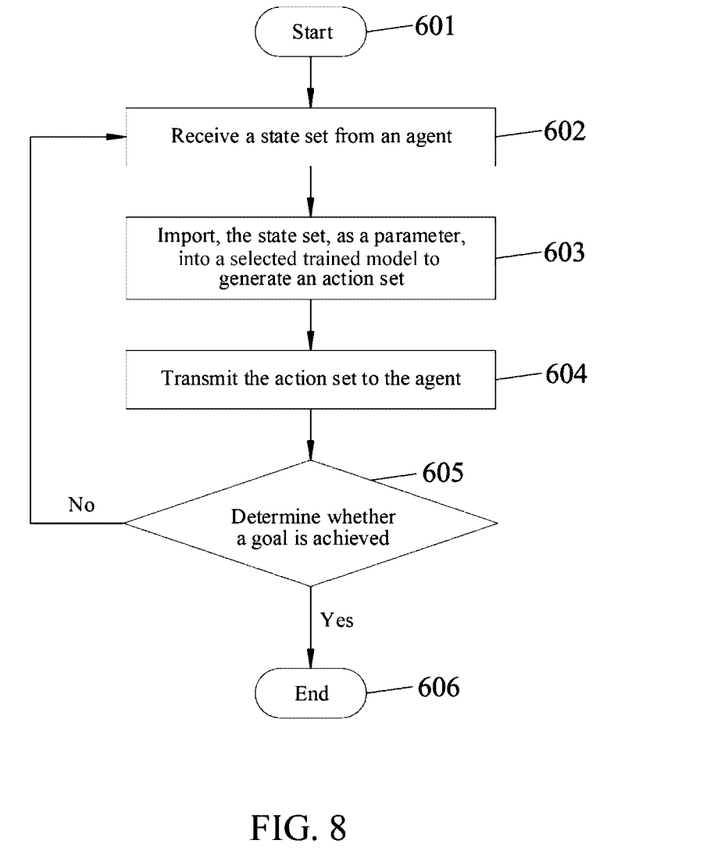
FIG. 8 is a flowchart illustrating steps of an estimation mode in this embodiment.
Figure 9:
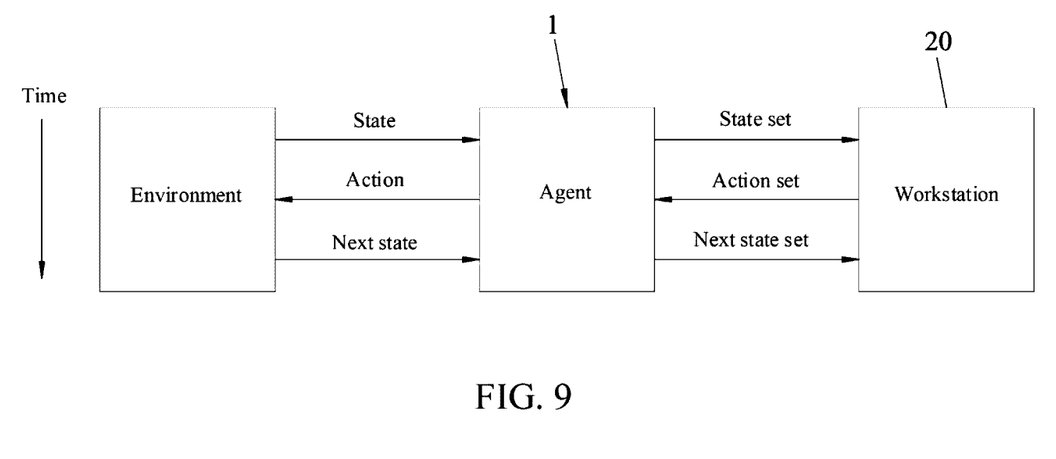
FIG. 9 is a block diagram illustrating a relationship between the estimation mode and time in this embodiment.

Referring to FIG. 2, FIG. 8, and FIG. 9, step 600 includes:

Step 601: Start.

Step 602: Receive a state set 11 from an agent 1 numbered 1a through the connection unit 21.

Step 603: A workstation 20 numbered 1a temporarily stores the state set 11 through the memory space 233, and imports the state set 11, as a parameter, through the operation core 234 into a selected trained model to generate an action set 12.

Step 604: The workstation 20 numbered 1a transmits the action set 12 to the agent 1 numbered 1a through the connection unit 21, so that the agent 1 numbered 1a interacts with an environment numbered 1a according to the action set 12, thereby changing a state of the environment numbered 1a.

Step 605: The workstation 20 numbered 1a determines, through the operation core 234, whether the cart 3 has more than 200 steps for 10 consecutive rounds, thus achieving the goal. If yes, perform step 606; if not, return to step 602.

Step 606: End.

Figure 10:
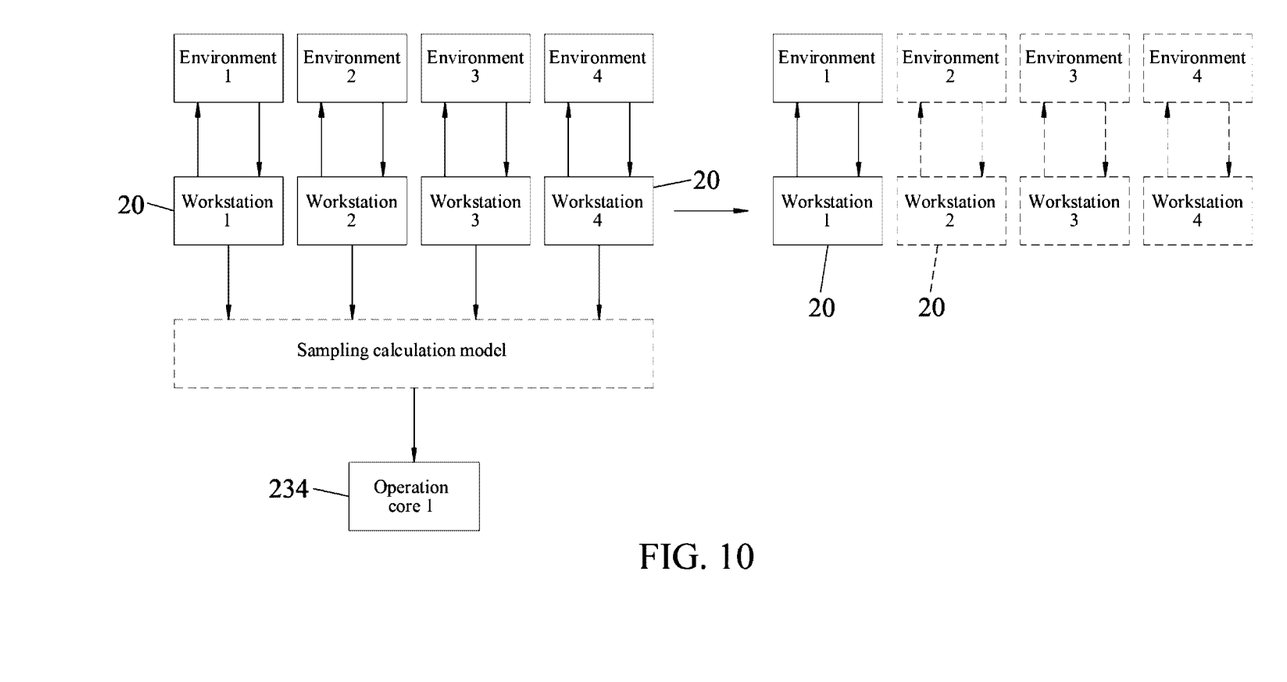
FIG. 10 is a schematic diagram illustrating that a best untrained model is automatically searched for by using one operation core as an example in this embodiment.
Figure 11:
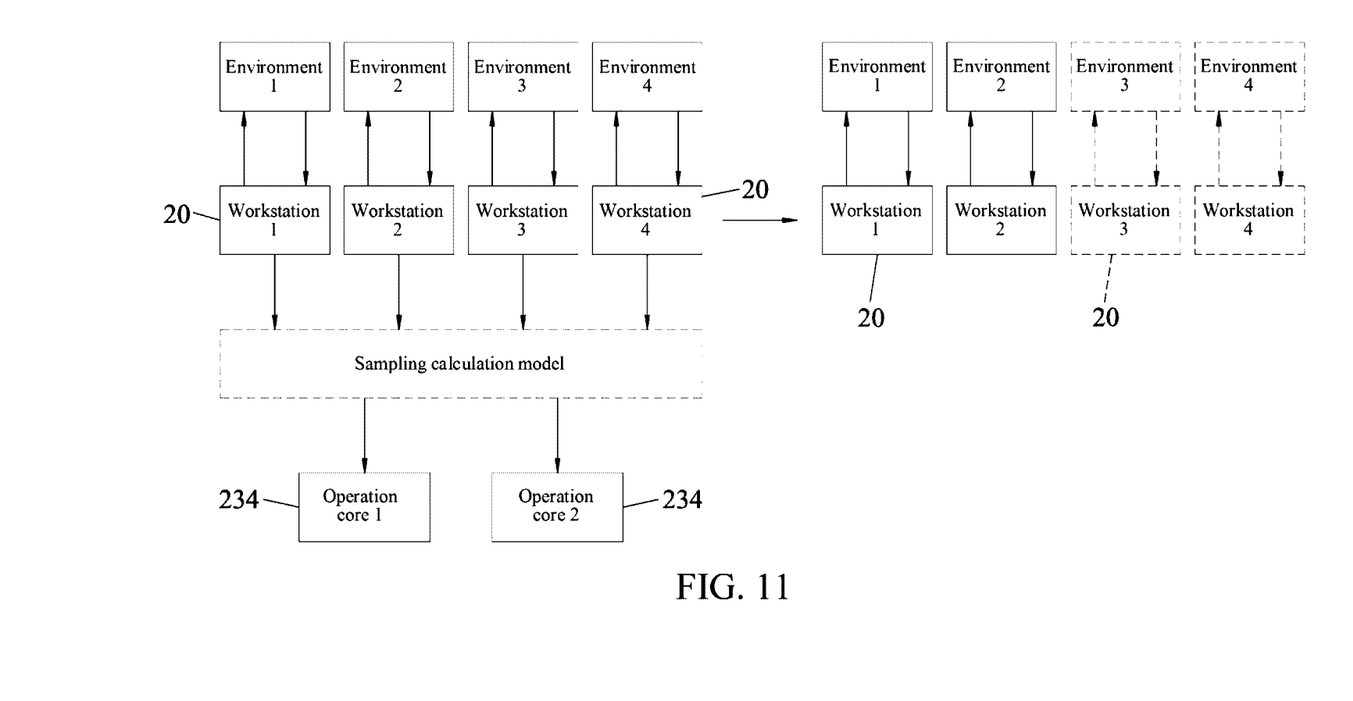
FIG. 11 is a schematic diagram illustrating that a best untrained model is automatically searched for by using two operation cores as an example in this embodiment.

In addition, referring to FIG. 10 and FIG. 11, it should be noted that in step 404, the untrained model is not limited to being selected by the set condition 10. In other variations of this embodiment, the untrained model may further be determined by the processing module 232 based on the number of a connected agent 1 and the number of operation cores 234, as parameters, through a sampling calculation model to automatically find the best untrained model. In this embodiment, the sampling calculation model is, for example, but not limited to, a Thompson Sampling algorithm, and P operation cores 234 and K workstations 20 are used as an example, and the description is shown as follows:

Referring to FIG. 10, assuming K=4 and P=1, when the best untrained model and a suitable workstation 20 are automatically searched for, the processing module 232 selects only one workstation 20 and one operation core 234 for sampling each time, and obtains an expected value, and then a workstation 20 with a highest expected value and an untrained model thereof are selected.

Referring to FIG. 11, assuming K=4 and P=2, when the best untrained model and the suitable workstation 20 are automatically searched for, the processing module 232 selects any two workstations 20 and two operation cores 234 for sampling each time, and selects one of the workstations 20 with a highest expected value to be compared to other workstations 20, and then the workstation 20 with a highest expected value and an untrained model thereof are selected.

Accordingly, because the sampling calculation model finally selects the workstation 20 with a higher expected value, an untrained model more suitable for the environment may be selected, thereby increasing learning efficiency.

It should be noted that the foregoing Thompson Sampling algorithm is a widely used algorithm at present. Because a person with ordinary knowledge in the field can infer additional details based on the foregoing description, the details are not described again.

Through the foregoing description, advantages of the foregoing embodiments may be summarized as follows.

1. According to the present invention, the reinforcement learning system is divided into an agent 1 that only needs to be able to observe and interact with the environment, and a server 2 located in the cloud and performing training through configured hardware resources, so that a hardware architecture and software resources of each agent 1 can be simplified, and learning efficiency can be greatly increased through the server 2.

2. According to the present invention, the workstation 20, the untrained model, and the action noise model in the cloud may be modularized through the foregoing special design, so that the foregoing modular workstation 20, the untrained model, and the action noise model may be reused or updated, and the server 2 of the present invention may be applied to different agents 1, effectively increasing the use efficiency.

3. According to the present invention, the untrained model may be directly updated as the trained model by using the foregoing modular design and final verification is performed, further increasing the learning efficiency.

4. In addition, according to the present invention, the best untrained model and the suitable workstation 20 may be automatically searched for by the processing module 232 through the sampling calculating model by using the number of the connected agents 1 and the number of the operation cores 234 as the parameters to further increase the learning efficiency.

The above descriptions are merely exemplary embodiments of the present invention, and are not intended to limit the scope of the embodiments of the present invention, any simple equivalent replacement and modification according to the scope of the patent application of the present invention and patent specification shall fall within the protection scope of the present invention.

What is claimed is:

1. A server of a reinforcement learning system, the server being connected to at least one agent, wherein according to a set condition, the at least one agent transmits a plurality of state sets related to a state of an environment, receives a plurality of action sets for performing an action, and transmits, during performing of the action, a plurality of feedback messages generated after interacting with the environment, the set condition being used to achieve a goal, and the server comprises:
   a connection unit in communication with the at least one agent through a network, and configured to receive the set condition of the at least one agent, the state sets, and the feedback messages, and transmit the action sets to the at least one agent;
   a storage unit storing a plurality of untrained models; and
   a processing unit comprising a calculating module and a processing module, the processing module is connected to the connection unit, the storage unit, and the calculating module, wherein the calculating module has a memory space and a plurality of operation cores, the processing module configures a predetermined ratio of the memory space and a predetermined number of the operation cores as at least one workstation according to the set condition, and after entering a reward mode, selects one of the untrained models to be temporarily stored in the at least one workstation, wherein the at least one workstation imports an initial state set, as a parameter, into one of the untrained models to generate an initial action set, then imports a current action set, a feedback message generated corresponding to the current action set, and a next state set, as parameters, into one of the untrained models for reinforcement learning, to generate a next action set, until the goal is achieved;
   wherein the server being connected to a plurality of the agents, and the processing module configures the predetermined ratio of the memory space as a plurality of workstations, and when the connection unit is connected to each of the agents, the processing module generates a unique identification code according to the each of the agents, transmits each of the identification codes to an individual of the agents through the connection unit, and temporarily stores the each of the identification codes in a corresponding workstation, the identification code being used to cause the state set, the action set, and the feedback message to be transmitted between the each of the agents storing a same of the identification code and the corresponding workstation, and the each of the identification codes comprising a primary numeric string and a secondary numeric string, wherein each of the primary numeric strings corresponds to a different environment, each of the secondary numeric strings corresponds to a different agent, and the processing module selects a corresponding untrained model according to the agent.

2. The server of the reinforcement learning system according to claim 1, wherein the storage unit comprises an untrained model pool and a trained model pool, the untrained model pool being configured to store the untrained model, and each of the workstations further updating, after the corresponding agent completes the goal, one of the untrained models completing the goal as a trained model, and storing the trained model in the trained model pool.

3. The server of the reinforcement learning system according to claim 2, wherein the storage unit further stores at least one action noise model for increasing an environmental exploration, the processing module further temporarily stores the at least one action noise model in the at least one workstation, and the at least one workstation further imports each of the action sets, as a parameter, into the action noise model, and then optimizes the each of the action sets.

4. The server of the reinforcement learning system according to claim 3, wherein the storage unit further stores a plurality of buffer data models used to determine a manner in which data is accessed and temporarily stored, the processing module further temporarily stores one of the buffer data models in the at least one workstation, so that a selected of the untrained model, a selected of the buffer data model, and the action noise model are temporarily stored in the at least one workstation.

5. The server of the reinforcement learning system according to claim 2, wherein each workstation further stores the identification code and the trained model in the trained model pool after the corresponding agent completes the goal, and generates a correspondence, the processing module further selects, according to the identification code of the each of the agents after being in an estimation mode according to the set condition, the trained model corresponding to the same identification code to be temporarily stored in the corresponding workstation, and the at least one workstation further generates the initial action set through the trained model by using a current state set as a parameter, and then generates a next action set by using a next state set as a parameter, until the goal is completed.

6. The server of the reinforcement learning system according to claim 1, wherein the untrained model selected by the processing module is determined by the processing module through a sampling calculation model according to the number of connected agents and the number of the operation cores.

7. The server of the reinforcement learning system according to claim 6, wherein the sampling calculation model is a Thompson Sampling algorithm.

8. A reinforcement learning method for causing at least one agent to implement following steps:
(a) communicating with a server through a network according to a set condition, the set condition being used to achieve a goal;
(b) transmitting the set condition to the server, so that the server and the at least one agent are in a reward mode according to the set condition;
(c) transmitting, to the server, a state set related to a state of an environment;
(d) receiving an action set for performing an action, the action set being generated by at least one workstation of the server by importing the state set of step (c), as a parameter, into an untrained model;
(e) interacting with the environment according to a current action set, and transmitting a feedback message and a next state set to the at least one workstation;
(f) receiving a next action set for performing the action, the next action set being generated by the at least one workstation by importing the action set in step (e), the feedback message in step (e), and the state set in step (e), as parameters, into the untrained model for reinforcement learning; and
(g) repeating step (e) to step (f), until the goal is completed;
wherein the server is in communication with a plurality of agents, and the server configures a predetermined ratio of the memory space as a plurality of workstations according to the set condition, and generates a unique identification code according to each of the agents, transmits each of the identification codes to an individual of the agents, and temporarily stores the each of the identification codes in the-a corresponding workstation, the identification code being used to cause the state set, the action set, and the feedback message to be transmitted between the each of the agents storing a same of the identification code and the corresponding workstation, and the each of the identification codes comprising a primary numeric string and a secondary numeric string, wherein each of the primary numeric strings represent a different environment, and each of the secondary numeric strings corresponds to a different agent, so that the server selects the-a corresponding untrained model according to the agent.

9. The reinforcement learning method according to claim 8, further comprising step (h) to step (l) after step (g), and step (h) to step (l) comprising:
(h) transmitting the state set to the server;
(i) receiving the action set generated by the at least one workstation after importing the state set of step (h), as a parameter, into a trained model;
(j) interacting with the environment according to the current action set, and transmitting a next state set to the at least one workstation;
(k) receiving a next action set generated by the at least one workstation after importing the state set of step (j), as a parameter, into the trained model; and
(l) repeating step (j) to step (k), until the goal is completed;
wherein, step (b) comprises:
(b-1) transmitting the set condition to the server; and
(b-2) determining whether to be the reward mode, if yes, performing step (c), and if not, performing step (h).

10. A reinforcement learning method for implementing following steps through a server:
(a) communicating with at least one agent through a network;
(b) receiving a set condition from the at least one agent, the set condition being used to achieve a goal;
(c) configuring a predetermined ratio of a memory space as at least one workstation according to the set condition;
(d) being in a reward mode according to the set condition, and selecting an untrained model to be temporarily stored in the at least one workstation;
(e) receiving an initial state set from the at least one agent and related to a state of an environment;
(f) importing, by the at least one workstation, the initial state set, as a parameter, into the untrained model to generate an initial action set;
(g) transmitting the action set to the at least one agent, so that the at least one agent interacts with the environment according to the action set;
(h) receiving a feedback message and a next state, the feedback message and the next state being generated through interaction between a current action set of the at least one agent with the environment;
(i) importing, by the at least one workstation, the current action set, the feedback message generated corresponding to the current action set, and a next state set, as parameters, into the untrained model for reinforcement learning to generate a next action set; and
(j) repeating step (g) to step (i), until the goal is completed;
wherein in step (a), the server is in communication with a plurality of agents, and in step (c), the server configures the predetermined ratio of the memory space as a plurality of workstations according to the set condition, and generates a unique identification code according to each of the agents, transmits each of the identification codes to an individual of the agents, and temporarily stores the each of the identification codes in a corresponding workstation, the identification code being used to cause the state set, the action set, and the feedback message to be transmitted between the each of the agents storing a same of the identification code and the corresponding workstation, and the each of the identification codes comprising a primary numeric string and a secondary numeric string, wherein each of the primary numeric strings represent a different environment, and each of the secondary numeric strings corresponds to a different agent, so that in step (d), the server selects a corresponding untrained model according to the agent.

11. The reinforcement learning method according to claim 10, further comprising step (k) after step (j), wherein the at least one workstation updates the untrained model completing the goal as a trained model, so that the identification code corresponds to the trained model.

12. The reinforcement learning method according to claim 11, further comprising step (l) to step (r) after step (k), and step (l) to step (r) comprising:
(l) determining, according to the set condition, whether to be an estimation mode, if yes, performing step (m), and if not, performing step (r);
(m) selecting, according to the identification code of the at least one agent, the untrained model corresponding to a same of the identification code to be temporarily stored in the at least one workstation;

(n) receiving a state set from the at least one agent and related to a state of the environment;
(o) importing, by the at least one workstation, the state set as a parameter, into the trained model to generate the action set;
(p) transmitting the action set to the corresponding agent, so that the corresponding agent interacts with the environment according to the action set;
(q) repeating step (n) to step (p) until the goal is completed; and
(r) ending;
wherein, step (d) comprises:
(d-1) determining, according to the set condition, whether to be the reward mode, if yes, performing step (d-2), and if not, performing step (l); and
(d-2) selecting the untrained model to be temporarily stored in the at least one workstation, and then performing step (e).

* * * * *